US008379633B2

(12) United States Patent
Usuba et al.

(10) Patent No.: US 8,379,633 B2
(45) Date of Patent: *Feb. 19, 2013

(54) CONCENTRATOR FOR SPEECH TELEPHONES AND METHOD OF COMMUNICATION OVER LAN USING SAME

(75) Inventors: Shinji Usuba, Tokyo (JP); Tomokazu Konishi, Tokyo (JP); Yoshinori Sekine, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/487,282

(22) Filed: Jun. 18, 2009

(65) Prior Publication Data
US 2010/0046503 A1    Feb. 25, 2010

Related U.S. Application Data

(63) Continuation of application No. 10/701,444, filed on Nov. 6, 2003, now Pat. No. 7,561,538, which is a continuation of application No. 09/254,864, filed as application No. PCT/JP97/02566 on Jul. 24, 1997, now Pat. No. 7,382,766.

(51) Int. Cl.
*H04L 12/56* (2006.01)
*H04L 12/66* (2006.01)
*H04Q 11/00* (2006.01)

(52) U.S. Cl. ......... 370/352; 370/401; 370/465; 379/219

(58) Field of Classification Search .................. None
See application file for complete search history.

(56) References Cited

U.S. PATENT DOCUMENTS

| 4,737,950 A | 4/1988 | Fechalos |
| 5,305,312 A * | 4/1994 | Fornek et al. ............... 370/264 |
| 5,384,766 A | 1/1995 | Yamato et al. |
| 5,539,741 A | 7/1996 | Barraclough et al. |
| 5,550,906 A | 8/1996 | Chau et al. |
| 5,561,666 A | 10/1996 | Christensen et al. |
| 5,572,677 A | 11/1996 | Luther et al. |
| 5,636,218 A | 6/1997 | Ishikawa et al. |
| 5,737,333 A | 4/1998 | Civaniar et al. |
| 5,737,337 A | 4/1998 | Voith et al. |
| 5,809,024 A | 9/1998 | Ferguson et al. |
| 5,859,848 A | 1/1999 | Miura et al. |
| 5,862,134 A | 1/1999 | Deng |
| 5,892,912 A | 4/1999 | Suzuki et al. |
| 5,933,607 A | 8/1999 | Tate et al. |

(Continued)

FOREIGN PATENT DOCUMENTS

| JP | 06-167065 | 2/1996 |
| JP | 06-187331 | 2/1996 |

(Continued)

*Primary Examiner* — Chi Pham
*Assistant Examiner* — Soon-Dong D Hyun
(74) *Attorney, Agent, or Firm* — Rabin & Berdo, P.C.

(57) ABSTRACT

Speech telephones are incorporated in a LAN, and, for example, when a voice telephone 5 communicates with another voice telephone 8, call control is performed through exchange of information between a PC 1 and a PC 4, juxtaposed with the voice telephones, respectively, via a LAN hub 10, a LAN switching unit 50, and a LAN hub 20. Speech data of the respective telephones 5, and 8 are packetized in the data block of a MAC frame by concentrators 30, and 40 for voice telephones, respectively, and relayed to LAN-SW interfaces 30*a*, and 40*a*. Frames having a function of absorbing fluctuation are applied to the data block of the interfaces 30*a* and 40*a*. Respective voice data packetized according to the MAC address of the MAC frame are delivered to the voice telephones 5, and 8, respectively, via the LAN switching unit 50, and the concentrators 30, and 40 for voice telephones.

6 Claims, 8 Drawing Sheets

U.S. PATENT DOCUMENTS

| | | |
|---|---|---|
| 5,940,495 A | 8/1999 | Bondarenko et al. |
| 6,026,088 A | 2/2000 | Rostoker et al. |
| 6,041,114 A | 3/2000 | Chestnut |
| 6,085,238 A | 7/2000 | Yuasa et al. |
| 6,215,790 B1 | 4/2001 | Volt et al. |
| 6,240,085 B1 | 5/2001 | Iwami et al. |
| 6,298,057 B1 | 10/2001 | Guy et al. |
| 6,345,047 B1 * | 2/2002 | Regnier ................. 370/352 |
| 6,463,051 B1 * | 10/2002 | Ford ...................... 370/352 |
| 6,463,053 B1 * | 10/2002 | Chen ...................... 370/352 |
| 6,577,642 B1 * | 6/2003 | Fijolek et al. ........... 370/465 |
| 6,614,781 B1 * | 9/2003 | Elliott et al. ............ 370/352 |
| 6,636,508 B1 * | 10/2003 | Li et al. .................. 370/389 |

FOREIGN PATENT DOCUMENTS

| | | |
|---|---|---|
| JP | 08340345 A | 12/1996 |
| JP | 9-98227 | 4/1997 |
| JP | 9-116633 | 5/1997 |
| JP | 9-135241 | 5/1997 |
| JP | 09116633 A | 5/1997 |
| JP | 9-214484 | 8/1997 |

\* cited by examiner

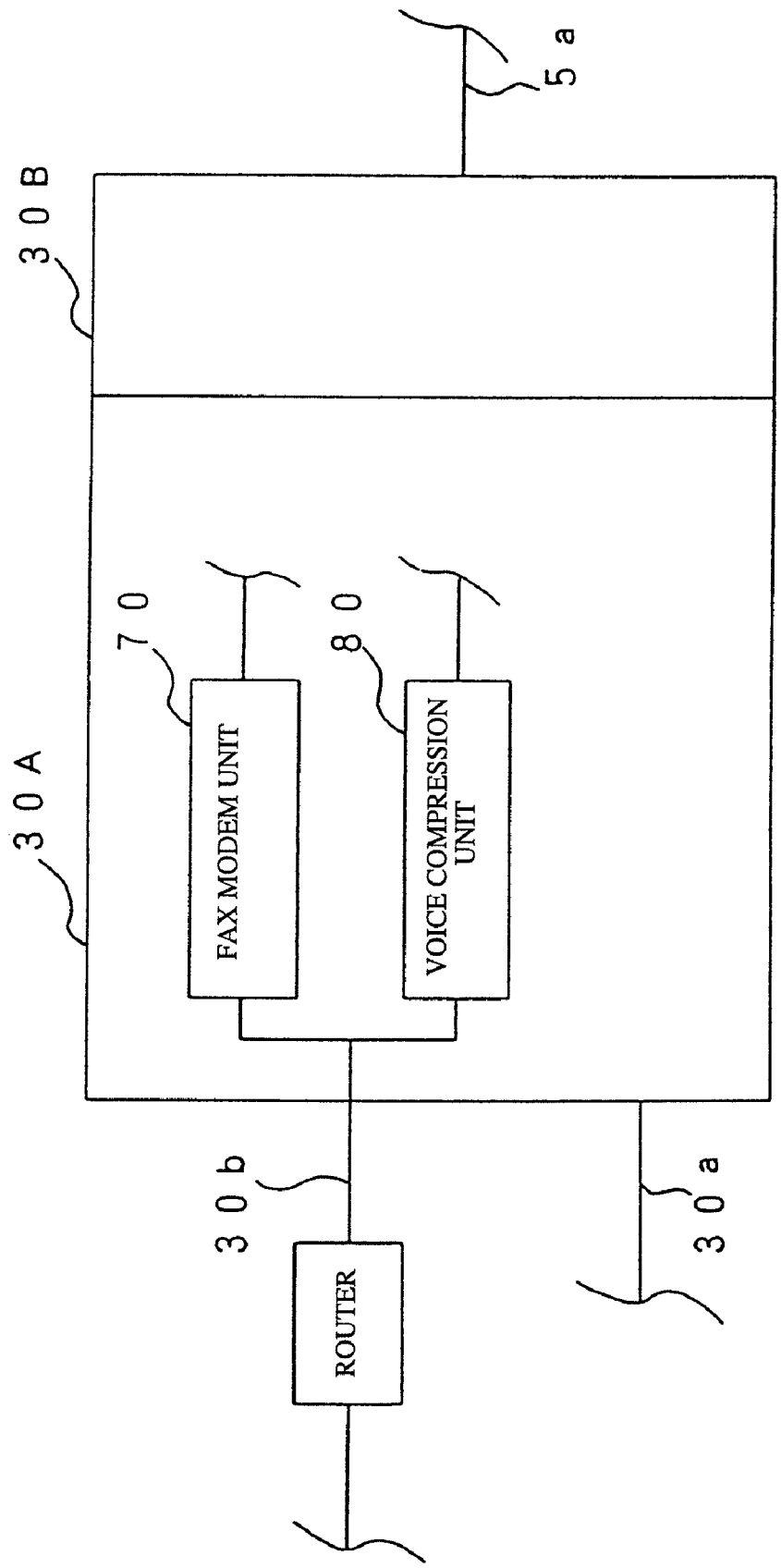

CONCENTRATOR FOR SPEECH TELEPHONES AND METHOD OF COMMUNICATION OVER LAN USING SAME

CROSS REFERENCE TO THE RELATED APPLICATIONS

This nonprovisional application is a continuation of U.S. application Ser. No. 10/701,444, filed Nov. 6, 2003, which was a continuation of U.S. application Ser. No. 09/254,864, having a national stage commencement date of Mar. 15, 1999 under 35 USC 371. U.S. application Ser. No. 09/254,864 was the national stage of International Application number PCT/JP97/02566, filed Jul. 24, 1997. U.S. application Ser. No 09/254,864 issued as patent 7,382,766 on Jun. 3, 2008 and U.S. Application number 10/701,444 issued as patent 7,561,538 on July 14, 2009.

TECHNICAL FIELD

The invention relates to a concentrator for voice telephones, accommodating the voice telephones, and the equivalent in Local Area Network (LAN) interfaces, and a method of communication over a LAN using the concentrators.

BACKGROUND TECHNOLOGY

In a conventional method of internal communication within a business compound, voice communications have been provided by a PBX (private branch exchange) accommodating voice telephones, and data communications have been provided by a LAN, independently from each other. Along with a decline in prices of personal computers (referred to as PCs hereinafter) and higher performance thereof, the PCs have become popularized as much as ordinary voice telephones, particularly, in recent times. Consequently, an environment wherein voice telephones are integrated into a LAN has come to be desired for internal communication within a business compound.

The conventional method of internal communication within a business compound has however had the following problem.

In spite of an attempt to integrate an infrastructure for internal communication within a business compound by incorporating voice telephones into a LAN, it has been difficult to implement such integration because a the peculiarity of 'voice' such as periodicity and need for real time response contradicts characteristics of data communications such as burst and high reliability. As a result, facilities for both a PBX and a LAN have been required, accompanied by installation of two wiring systems.

It is therefore an object of the invention to integrate the infrastructure for the internal communication within a business compound into a LAN so that the voice telephones can be incorporated therein without need for the PBX.

SUMMARY OF THE INVENTION

A concentrator (referred to as TLA hereinafter) for voice telephones according to a first aspect of the invention, installed in a LAN comprising a LAN switching unit for switching and connecting a plurality of interfaces incorporated therein, and a plurality of LAN concentrators (referred to as LAN hub hereinafter) accommodating equipment connected to the LAN switching unit via the interfaces, respectively, and for performing data communication through the LAN, is constructed as follows to solve the problem described above.

The TLA according to the first aspect of the invention comprises a LAN interface connected to the LAN switching unit, and a set or plural sets of voice telephone interfaces connected to one or a plurality of voice telephones juxtaposed with the equipment. The TLA has a function of converting voice data transmitted and received by the set or the plural sets of the voice telephone interfaces into MAC frames of a fixed length, and relaying only the voice data assembled into the MAC frames to the LAN interface.

A TLA according to a second aspect of the invention differs from the TLA of the first aspect of the invention comprising the LAN interface connected to the LAN switching unit in that the former comprises a second LAN interface for performing transmission and reception between a CPU incorporated therein and the LAN hub.

A TLA according a third aspect of the invention is a modification of the TLA of the first aspect of the invention, and has a function of converting signals from circuits of analog telephone network subscribers into call control protocol according to TCP-IP so that the analog telephone subscribers' terminals are accommodated.

A TLA according to a fourth aspect of the invention is another modification of the TLA of the first aspect of the invention, and provided with a second LAN interface for performing transmission and reception of data with a CPU incorporated therein, different from the LAN interface connected to the LAN switching unit as in the case of the TLA of the first aspect of the invention. The TLA of the fourth aspect of the invention has a function of performing call control procedure according to TCP-IP, and converting voice data received from the plurality of voice telephones accommodated therein into TCP-IP packets or UDP-IP packets, and also a function of transmitting and receiving the TCP-IP packets or UDP-IP packets via the second LAN interface.

A TLA according to a fifth aspect of the invention is a modification of the TLA of the fourth aspect of the invention, and comprises a router connected to the second LAN interface for connecting the second LAN interface to either outside the LAN or the LAN hubs at option.

A method of communication according to a sixth aspect of the invention is carried out over a LAN comprising a plurality of LAN hubs accommodating equipment for performing data communication, a plurality of the aforesaid TLAs, and the LAN switching unit having a plurality of ports and for switching and connecting between the plurality of the LAN hubs and the plurality of the TLAs as follows.

That is, call control on one or a plurality of voice telephones connected to each of the TLAs is performed by a PC or work station incorporated in each of the LAN hubs.

A method of communication according to a seventh aspect of the invention is a modification of the method of communication of the sixth aspect of the invention, whereby in case that a response is not obtained from a PC or work station on the call-in side by the method of the sixth aspect of the invention, arrival of a call request is notified to the user of the PC or work station while the response is detected by use of control channel signals of the voice telephone interface on the call-in side.

A method of communication according an eighth aspect of the invention is carried out over a LAN comprising the plurality of the TLAs of the first aspect of the invention, the plurality of LAN hubs incorporating equipment for performing data communication over the LAN, and the LAN switching unit having the plurality of the ports as follows.

That is, routing of packetized voices for communication by the voice telephones between the TLAs is performed by switching and connecting operation of the LAN switching unit based on a MAC address in the MAC frame in which the packetized voices are assembled.

A method of communication according to a ninth aspect of the invention is carried out over a LAN comprising the plurality of LAN hubs accommodating equipment for performing data communication, the plurality of the TLAs, and the LAN switching unit having the plurality of ports and for switching and connecting between the plurality of the LAN hubs and the plurality of the TLAs as follows.

That is, voice data transmitted and received by the voice telephones are packetized for communication over the LAN by applying a frame having a function of absorbing fluctuation in arrival time of packetized voices to the data block of the MAC frame.

With the TLA according to the first aspect of the invention, constructed as above, voice data transmitted and received by one of the voice telephones incorporated in the TLA are converted into the MAC frame, relayed to the LAN interface, and delivered to the LAN switching unit via the LAN interface. The voice data are then transmitted to the other voice telephone through the other TLA with switching and connecting operation of the switching unit.

With the TLA according to the second aspect of the invention, wherein the second LAN interface for performing transmission and reception between the CPU installed therein and the LAN hub in addition to the LAN interface connected to the LAN switching unit, provided in the TLA of the first aspect of the invention described hereinbefore, call control on the voice telephone accommodating the TLA is performed by a PC or work station incorporated in the LAN hub like the sixth aspect of the invention.

With the TLA according to the third aspect of the invention, signals from circuits of analog telephone network subscribers sent out by a general telephone are converted into call control protocol according to TCP-IP. That is, call control can be performed on the side of the telephone and TLA without the need of call control by the PC or work station.

With the TLAs according to the fourth and fifth aspects of the invention, voice data transmitted by the voice telephone are converted into UDP-IP packets or TCP-IP packets, and the UDP-IP packets or TCP-IP packets are transmitted or received via the second LAN interface. Accordingly, the voice telephone can perform transmission and reception of voice data with networks outside the LAN via routers.

With the method of communication according to the sixth aspect of the invention, call control on the one or the plurality of the voice telephones incorporated in the TLA is performed by the PCs or work stations incorporated in the LAN hub.

With the method of communication according to the seventh aspect of the invention, in case that a response from the PCs or work stations on the call-in side is not obtained by the method of communication of the sixth aspect of the invention, arrival of a call request is notified, and the response is detected by use of the control channel signals of the voice telephone interface on the call-in side.

With the method of communication according to the eighth aspect of the invention, routing of the packetized voices for communication by the voice telephones between the TLAs is performed by switching and connecting operation of the LAN switching unit based on the MAC address in the MAC frame in which the packetized voices are assembled.

With the method of communication according to the ninth aspect of the invention, the voice data transmitted and received by the voice telephones are packetized for communication over the LAN by applying the frame having a function of absorbing fluctuation in arrival time of the packetized voices to the data block of the MAC frame. The problems described hereinbefore are thus solved.

BRIEF DESCRIPTION OF THE DRAWINGS

FIG. 8 is a block diagram of a TLA provided with an additional function.

BEST MODE FOR CARRYING OUT THE INVENTION

Figure 1:
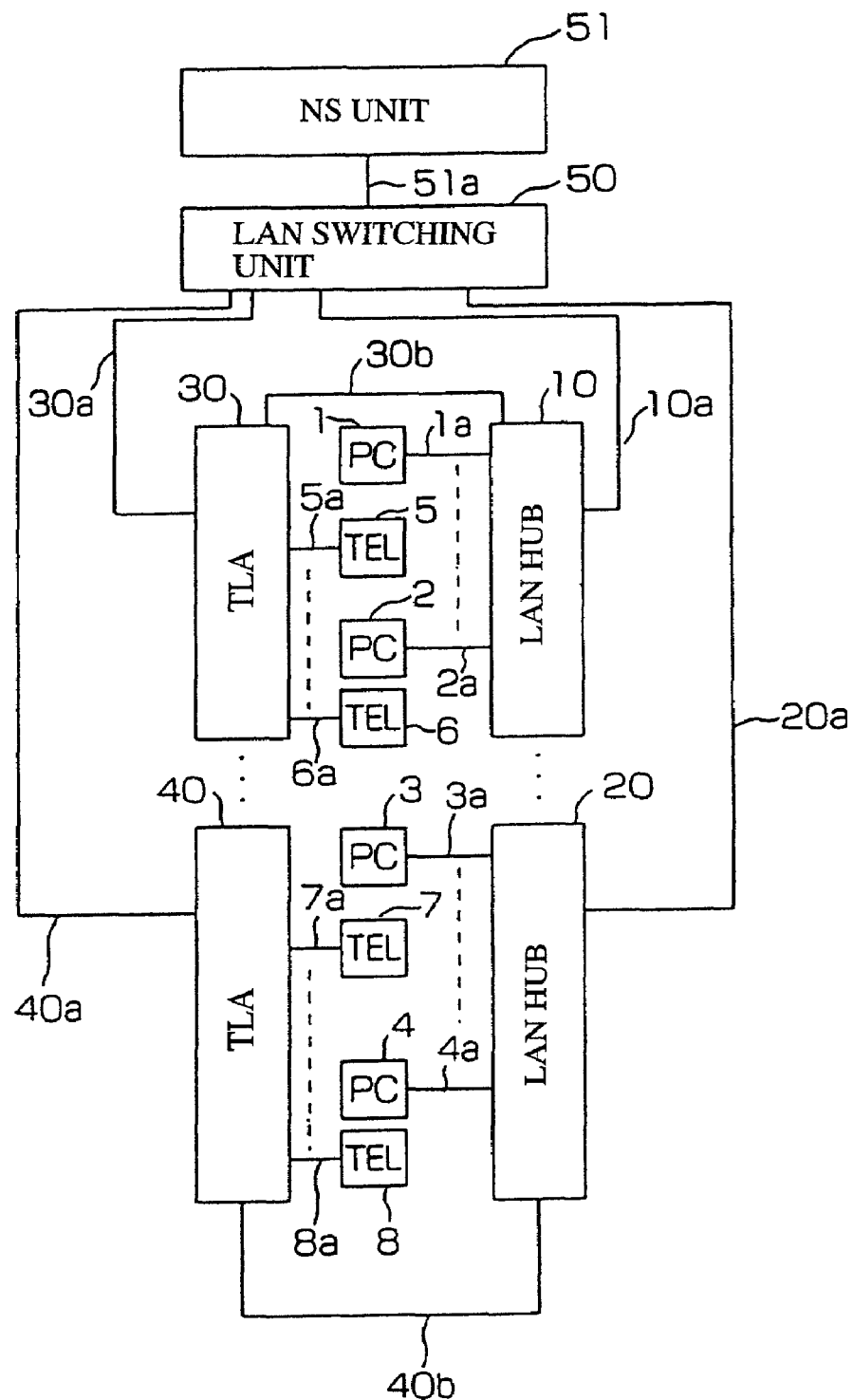
FIG. 1 is a block diagram showing the construction of a concentrator (TLA) for voice telephones according to a first embodiment of the invention, used for a voice switching system over a LAN.

FIG. 1 is a block diagram showing the construction of a concentrator (TLA) for voice telephones according to a first embodiment of the invention, used for a voice switching system over a LAN. The voice switching system over the LAN comprises a plurality of information equipment, that is, personal computers (PCs) 1, 2, 3, and 4, voice telephones (TELs) 5, 6, 7, and 8, disposed corresponding to the respective PCs, two LAN hubs 10, and 20, incorporating the PCs 1, 2 and 3, 4, respectively, and two TLAs 30, and 40, incorporating the voice telephones 5, 6, and 7, 8, respectively. There are cases where the LAN hubs 10, and 20 incorporate work stations therein instead of the PCs 1 to 4, respectively.

The PCs 1, 2, 3, and 4 are provided with a LAN interface of IEEE 802.3, respectively, having, for example, a communication port made of 10BASE-T, and a communication protocol, TCP (UDP)/IP. The PCs 1 and 2 are connected to the LAN hub 10 via the LAN interface 1*a* and 2*a* of IEEE 802.3 specification, respectively, while the PCs 3 and 4 are connected to the LAN hub 20 via the LAN interface 3*a* and 4*a* of the identical IEEE 802.3 specification, respectively. The respective voice telephones 5, 6, 7, and 8 have functions of transmitting and receiving voice data, and do not necessarily require a function of transmitting and receiving call control information.

The TLAs 30 and 40 are provided with plural sets of interfaces (referred to as voice interface hereinafter) for two-wire line digital voice telephones, and two LAN interfaces of IEEE 802.3 specification, respectively. The voice telephones 5 and 6 are connected to the TLA 30 via the voice interfaces 5*a* and 6*a* thereof, respectively, while the voice telephones 7 and 8 are connected to the TLA 40 via the voice interfaces 7*a* and 8*a* thereof, respectively.

The LAN hubs 10 and 20 are connected to the LAN switching unit 50 via LAN interfaces of IEEE 802.3 specification, 10*a* and 20*a*, respectively.

One of the two LAN interfaces of the TLA 30 and TLA 40, that is, 30*a* and 40*a* are connected to one port of the LAN switching unit 50, respectively. The interfaces 30a and 40a are referred to as LAN-SW interfaces hereinafter. The other of the two LAN interfaces of the TLA 30 and TLA 40, that is, 30b and 40b are second LAN interfaces thereof, respectively, and connected to one port of the LAN hub 10 and LAN hub 20, respectively. The interfaces 30b and 40b are referred to as LAN-HUB interfaces hereinafter.

The LAN switching unit 50 is a connector between LANs having a function of exchanging frames in data communication over LANs, and for switching on and off on the basis of a MAC address in a LAN frame The LAN switching unit 50 is connected to a NS unit 51 also via an interface 51a of IEEE 802.3 specification.

The NS unit 51 stores a data base for MAC addresses of clients using the LAN, terminal identification numbers, and the like. The NS unit 51 has a function of providing information in the data base in response to inquiries from prospective clients of the LAN, that is, the PCs 1 to 5, the LAN hubs 10, 20, and the TLAs 30, 40.

Figure 2:
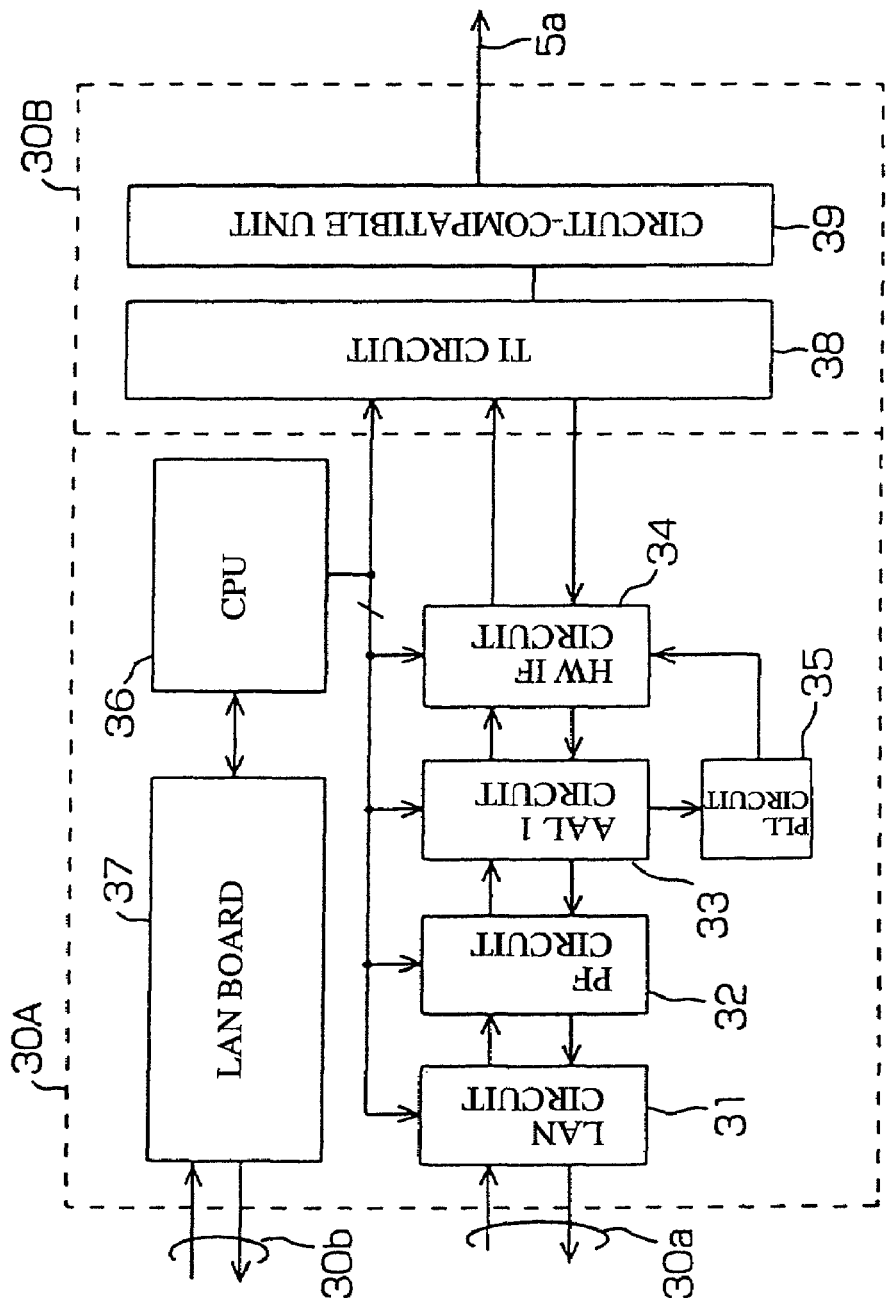
FIG. 2 is a block diagram showing the construction of TLA 30 in FIG. 1.

FIG. 2 is a block diagram showing the construction of the TLA 30 in FIG. 1.

The TLA 30 comprises a TLA controller 30A and an interface package unit 30B.

The TLA controller 30A comprises a LANC circuit 31 connected to the LAN-SW interface 30a and a PF circuit 32 connected to the LANC circuit 31. The PF circuit 32 is connected to an AAL 1 circuit 33, which is connected to an HWIF circuit 34 and a PLL circuit 35 while an output side of the PLL circuit 35 is connected also to the HWIF circuit 34. The HWIF circuit 34 is constituted so as to do input and output with the interface package unit 30B. The TLA controller 30A further comprises a CPU 36 and a LAN BOARD 37. The CPU 36 is constituted so as to control the LANC circuit 31, the PF circuit 32, the AAL 1 circuit 33, the HWIF circuit 34, and the LAN BOARD 37. The LAN BOARD 37 is connected to the LAN HUB interface 30b. On the other hand, the interface package unit 30B is provided with a TI circuit 38. The TI circuit 38 is connected to the HWIF circuit 34, and also to the voice interface 5a via a circuit-compatible unit 39. The interface package unit 30B accommodates a plurality of voice telephones in addition to the voice telephone 5. Accordingly, the TI circuit 38 and the circuit-compatible unit 39 are installed so as to be able to cope with the plurality of the voice telephones. Each TI circuit 38 is also under control of the CPU 36. The TLA 40 has a similar internal constitution as that of the TLA 30.

Figure 3:
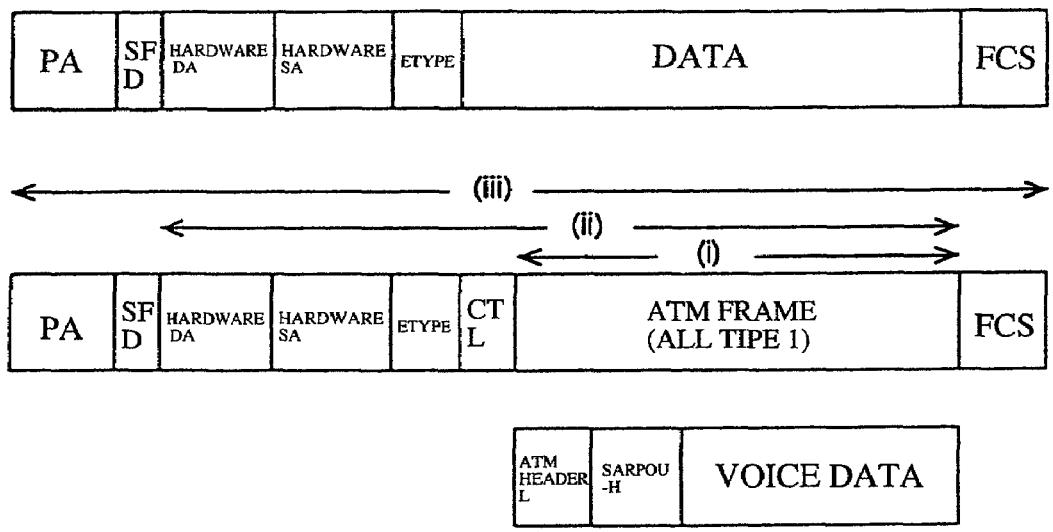
FIG. 3 is a schematic illustration of a MAC frame format used in FIG. 1.

FIG. 3 is a view illustrating a format of the MAC frame used in FIG. 1.

In this embodiment of the invention, the MAC (Media Access Control) frame is used for a frame format. As shown in FIG. 3, the MAC frame consists of preamble (PA), SFD (Start Frame Delimiter), hardware DA (Destination Address), hardware SA (Service Address), ETYPE, Data Block, and Frame Check Sequence (FCS). In the case of the voice switching system shown in FIG. 1, voice data are packetized, and a packetized voice frame is assembled by substituting the data block of the MAC frame with the ATM (Asynchronous Transfer Mode)●AAL type 1 (JT 1.363) frame. The ATM●AAL type 1 frame is composed of a ATM header, a SAPDU-H field having a function of fluctuation absorption, and a voice data field. Now referring to FIG. 3, functions of respective parts of the TLA 30 are described.

The LANC circuit 31 is for assembling and disassembling the MAC frame. The LAN BOARD 37 constitutes a LAN interface of IEEE 802.3 specification for enabling the CPU 36 to communicate control information with other PCs and the equivalent. The PF circuit 32 is for deleting the MAC address, and the like out of the MAC frame received from the LANC circuit 31, extracting the ATM●AAL type 1 shown in FIG. 3 therefrom, and delivering same to the AAL 1 circuit 33. The PF circuit 32 has also functions of adding the MAC address, a length of transmitting data, and control bit (CTL) designated by the CPU 36 to a ATM●AAL type 1 frame compiled in the AAL 1 circuit 33, and delivering same to the LANC circuit 31.

The AAL 1 circuit 33 converts voice data received from the interface package unit 30B with time division multiplexing into the ATM●AAL type 1 frame, delivers same to the PF circuit 32, converts packetized voices of the ATM●AAL type 1 received from the PF circuit 32 into a time division multiplexing interface, and delivers same to the interface package unit 30B. The AAL 1 circuit 33 also has a function of absorbing fluctuation, that is, differences in arrival time of the packetized voices via a asynchronous interface.

The HWIF circuit 34 generates synchronous signals for transmission by time division multiplexing using the PLL circuit 35 for an interface with the interface package unit 30B, performing transmission and reception of voice data and control data by time division multiplexing with the interface package unit 30B.

The HWIF circuit 34 has also functions of holding down-load data from the CPU 36, and adjusting PAD for down-load data received from the PCs, and the equivalent while transmitting silent pattern, howler, or tone ringer to the voice telephones. The TI circuit 38 in the interface package unit 30B performs conversion of frame formats over the circuit, based on synchronous signals from the HWIF circuit 34, performing transmission and reception of the voice data and the control data with the HWIF circuit 34 by time division multiplexing.

Figure 4:
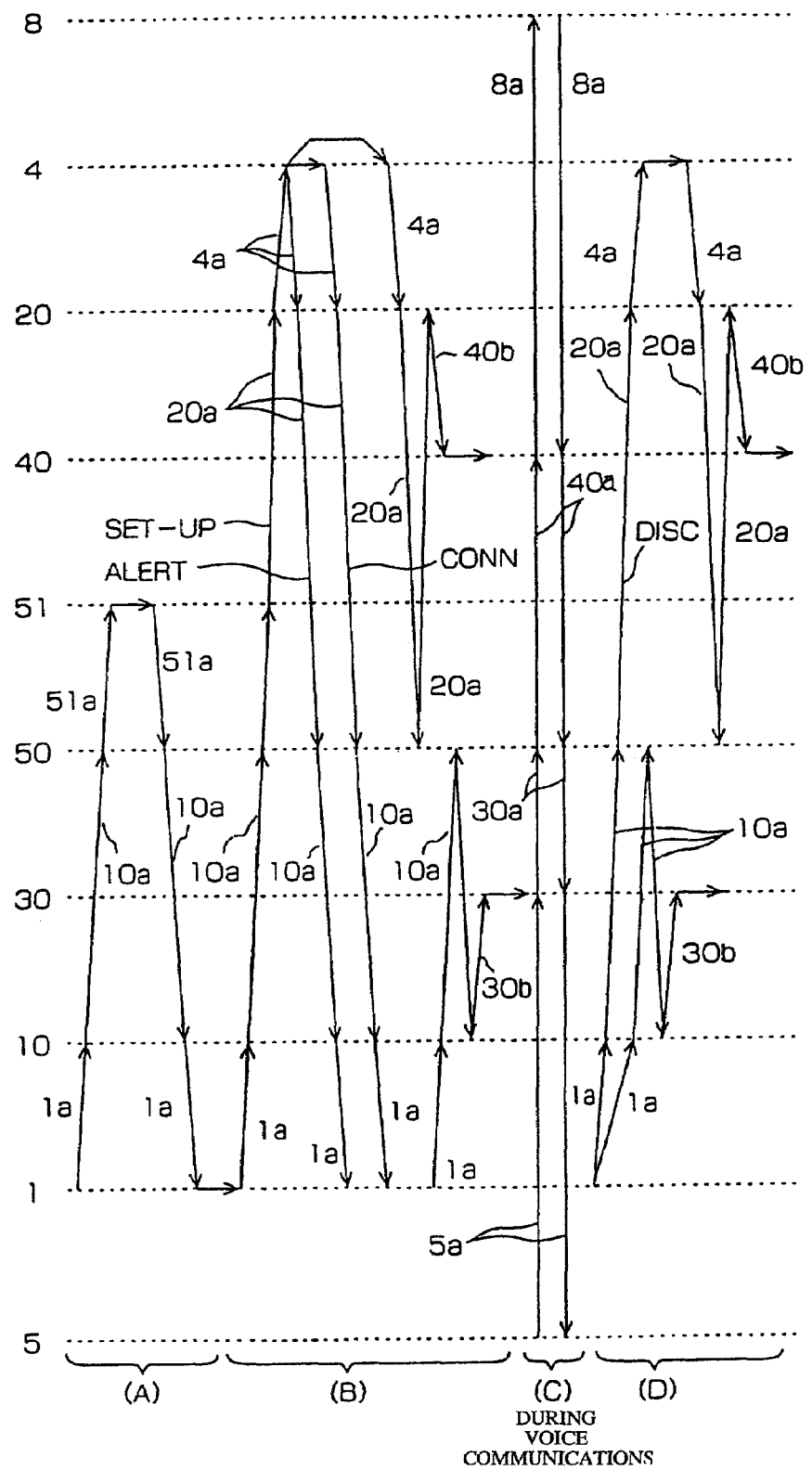
FIG. 4 is a chart showing operation sequence of the voice switching system shown in FIG. 1.

FIG. 4 is a chart showing operation sequence of the TLA, used for the voice switching system over the LAN, shown in FIG. 1, indicating directions of transmission and processing periods. The directions of transmission are denoted by the interface numbers shown in FIG. 1. Now referring to FIG. 4, operation of the system is described hereinafter when call request, call or voice communication, and disconnection are performed between the voice telephone 5 associated with the PC 1 and the voice telephone 8 associated with the PC 4. Meanwhile, the LAN-HUB interfaces 30b, 40b and the LAN-SW interfaces 30a, 40a of the TLAs 30 and 40, respectively, are assigned respective MAC addresses, and the voice telephones incorporated in the TLAs 30 and 40, respectively, are to be identified by VPI/VCI numbers in the ATM header shown in FIG. 3, or voice telephone numbers used in CTL bit shown in the figure. The PCs 1 to 4 or work stations and the NS unit 51 are also assigned respective MAC addresses requiring no particular conditions. Further, in the system according to this embodiment of the invention, for communication over interfaces other than the interfaces 5a, 30a, 40a, and 8a, a communication protocol, for example, TCP/IP is used.

Call control for communication is first performed.

The user of the voice telephone 5 transmits an inquiry from the PC 1 to the NS unit 51 for information on the PC 4 [the MAC address of the PC 4, including IP (Internet Protocol)] and the voice telephone 8 (the MAC addresses of the LAN-HUB interface 40b and the LAN-SW interface 40a of the TLA 40, including the number of the voice telephone 8), and receives same [period (A) in FIG. 4]. For this inquiry, the LAN hub 10 and the interfaces 1a, 10a, and 51a via the LAN switching unit 50 are used.

The PC 1, upon receiving the information, transmits call set-up request (SET-UP) information to the PC 4 via the interfaces 1a, 10a, 20a, and 4a. The call set-up request information includes the MAC address of the LAN-SW interface 30a of the TLA 30 and the number of the voice telephone 5.

The PC 4, upon receiving the call set-up request (SET-UP) information, takes it as a call, acceptance request, and transmits calling out information (ALERT) to the PC 1 via the interfaces 4a, 20a, 10a, and 1a in reverse order to the call set-up request case. The PC 4, upon detecting response given by the user thereof through keyboard entry, or the like, transmits response (CONN) information to the PC 1. For the transmission, the same interfaces as for the calling out information, 4a, 20a, 10a, and 1a are used. The PC 4 also transmits to the LAN hub interface 40b of the TLA 40 information on the number of the voice telephone 8, the MAC address of the TLA 30, and the number of the voice telephone 5 for routing of voice data in the direction from the voice telephone 8 to the voice telephone 5. For this transmission performed through the LAN switching unit 50 and the LAN hub 20, the interfaces 4a, 20a, and 40b are used. The information described above is delivered to the CPU 36 in the TLA 40 via the LAN BOARD 37 therein.

The TLA 40, upon receiving the information, adds the MAC address of the LAN-SW interface 30a of the TLA 30 and the number of the voice telephone 5 to voice data corresponding to the number of voice telephone 8, and transmits same assembled in the format shown in FIG. 3 to the LAN switching unit 50 via the LAN-SW interface 40a.

On the other hand, the PC 1, upon receiving response from the PC 4, transmits to the LAN-HUB interface 30b of the TLA 30 information on the number of the voice telephone 5, the MAC address of the TLA 40, and the number of the voice telephone 8 via the interface 1a and the LAN hub 10 for routing of voice data in the direction from the voice telephone 5 to the voice telephone 8. The information described above is delivered to the CPU 36 in the TLA 30 via the LAN BOARD 37 therein.

The TLA 30, upon receiving the information, adds the MAC address of the LAN-SW interface 40a of the TLA 40 and the number of the voice telephone 8 to voice data corresponding to the number of voice telephone 5, and transmits same assembled in the format shown in FIG. 3 to the LAN switching unit 50 [period (B) in FIG. 4].

Upon completion of routing of packetized voices via the interfaces 5a, 30a, 40a, and 8a as described above, the voice telephone 5 is in a state of call or voice communication with the voice telephone 8 [period (C) in FIG. 4].

When the user of the voice telephone 5 wishes to terminate voice communication, the PC 1 gives a command for link release to the TLA 30 while transmitting disconnection (DISC) information to the PC 4 via the interfaces 1a, 10a, 20a, and 4a. The command to the TLA 30 is delivered to the LAN switching unit 50 via the interfaces 1a and 10a, and the LAN switching unit 50 delivers the command to the TLA 30 via the interfaces 10a and 30b.

The TLA 30, upon receiving the command for link release, stops transmission of packetized voices corresponding to the number of the voice telephone 8, and transmits a silent pattern from the HWIF circuit 34 in the TLA 30 against descending voice data from the voice telephone 8. Meanwhile, the PC 4, upon receiving the disconnection information, gives a command for link release to the TLA 40. Operation thereafter is similar to the case of the TLA 30 [period (D) in FIG. 4].

The constitution of a voice data frame (in-channel data) is described.

The interface package unit 30B shown in FIG. 2, interfaced with the LAN hub 10, is connected to a plurality of (for example, 32 lines) voice telephones, and a frame format used over the lines has B 1 channel and D channel. Speech data is transmitted and received via the B 1 channel, and other control information via the D channel. The TI circuit 38 of the interface package unit 30B performs time division multiplexing interface (referred to as highway) conversion of the frame format over the circuits by the synchronous signals from the HWIF circuit 34.

The HWIF circuit 34 makes a selection on whether a descending voice channel is relayed to the AAL 1 circuit 33 or data for a silent pattern, howler, and ringer tone data are transmitted to the channel, according to a command from the CPU 36. The AAL 1 circuit 33 converts voice data transmitted from the interface package unit 30B via the HWIF circuit 34 into the ATM●AAL 1 frame (JT-1.363) such that differences in arrival time of packetized voices over an asynchronous network, that is, fluctuation, can be absorbed. A range of packetization in the AAL 1 circuit 33 is as denoted by (i) in FIG. 3.

The PF circuit 32 adds, according to a command from the CPU 36, DA, SA, ETYPE, and CTL bit of the MAC frame of IEEE 802.3 as specified when a call is initiated to voice data packetized in the AAL 1 circuit 33, and transmits same to the LANC circuit 31. A range of packetization in the PF circuit 32 is as denoted by (ii) in FIG. 3. The LANC circuit 31 makes further addition of PA, SFD, and FCS, completing the MAC frame of IEEE 802.3 specification as denoted by (iii) in FIG. 3, which is then transmitted to the LAN switching unit 50.

The TLA according to the first embodiment of the invention as described above has the following advantages.

(1) Voice communication can be achieved without need for a PBX by adding the TLAs 30, 40 to a LAN provided with the LAN switching unit 50, and the LAN hubs 10, 20 incorporating equipment such as the PCs 1 to 4 or work stations.

(2) The voice telephones 5 to 8 can be considerably simplified in the construction thereof as a keypad used for transmitting selection signals is unnecessary because information equivalent to call control can be controlled by the PCs 1 to 4.

(3) The ATM●AAL type 1 frame constitution in FIG. 3 wherein packetized voice frame for transmission over the LAN after packetization is assigned to a data block of the MAC frame is adopted in this case. Accordingly, the overhead for packetized voices is less than in the case of same being assigned to a UDP/IP frame, and throughput is increased while delay time for packetization is reduced owing to easier protocol processing. Further, routing outside the system can be performed without use of routers through processing at the MAC frame level by the LAN switching unit 50, delay time due to routing is less, and deterioration in voice quality due to delay, posing a problem particularly in voice communication, is also decreased.

The voice frame assigned to the data block of the MAC frame absorbs fluctuation by ATM●AAL 1, and is capable of absorbing fluctuation in arrival time of packetized voices when the LAN switching unit 50 is operating at high loads, ensuring normal conversation over the LAN.

(4) As the LAN-SW interface 40a is installed independently from the LAN-HUB interface 40b, there will be no contention in transmission of data with other PCs and work stations, and consequently, the number of voice telephones that can be accommodated in each system can be calculated with ease. For example, in the case of using full duplex 10 BASE-T, accommodation of 94 lines per one interface is ensured assuming that actual throughput for each circuit is 6.144 Mb/s, and voice data for each channel is 64 Kb/s.

(5) The capacity of the system can be easily increased by installing additional TLAs that are incorporated in the LAN switching unit 50. Therefore, the system according to the invention can cope with a need for scale-up with greater ease than the case of a PBX having limitations on the maximum capacity alines that are accommodated.

Second Embodiment

Figure 5:
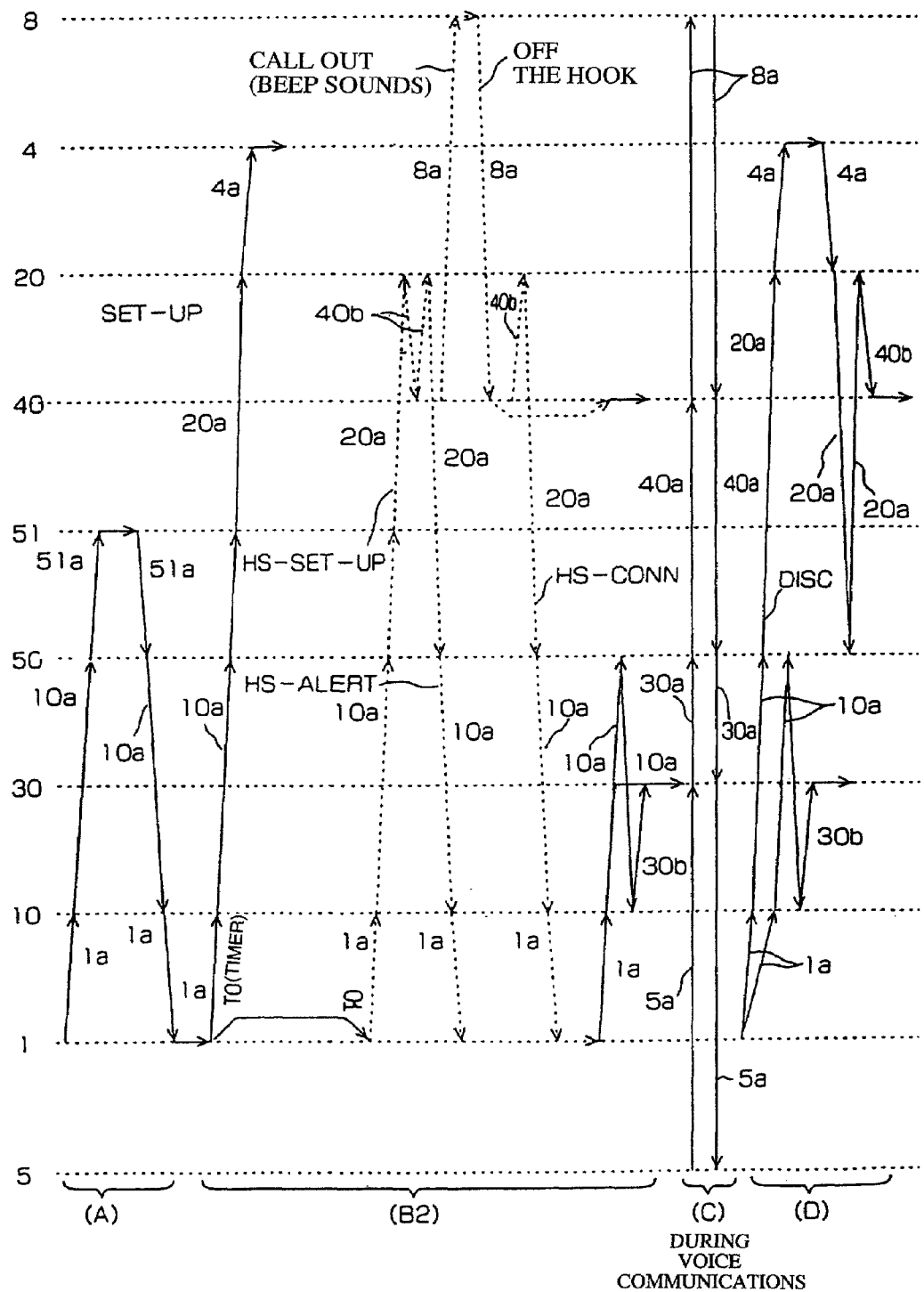
FIG. 5 is a sequence chart showing a method of communication over a LAN by use of a TLA according to a second embodiment of the invention.

FIG. 5 is a sequence chart showing a method of communication over a LAN by use of a TLA according to a second embodiment of the invention.

The TLA according to the first embodiment has a drawback that when a power supply source for the PC 4 is turned off, the voice telephone 8 can not be called up. That is, in the case of the first embodiment, call control on communication between the voice telephones is performed by the PCs 1 and 4. Consequently, in case of the power supply source for the PC 4 on a call receiving side being off, it is impossible to call up. The method of communication according to the second embodiment of the invention can overcome the drawback.

Operation shown in FIG. 5 differs only in a period (B2) from that for the first embodiment of the invention shown in FIG. 4, and is otherwise the same as in the case of the first embodiment. Only the period (B2) is described hereinafter. Information described hereinafter is of the same contents as that for the first embodiment unless otherwise mentioned.

The PC 1, upon receiving information on the voice telephone 8 in the period (A) of the sequence chart shown in FIG. 5, activates a soft timer TO (CONN waiting timer) while transmitting a call set-up request (SET-UP) to the PC 4. When the power supply source for the PC 4 is off, a response (ALERT, CONN) to the call set-up request is not returned. When a time set at the timer is reached (T.O), the PC 1 transmits a call set-up request (HS-SET-UP) to the TLA 40. The information transmitted includes the MAC address of the LAN-SW interface 40a of the TLA 40, the number of the voice telephone 5, the number of the voice telephone 8 to which the call is directed, and addresses of the PC 1, required over the LAN (MAC.IP, and the like), and delivered to the LAN hub 20 via the interfaces 1a, 10a, and 20a, and further, to the TLA 40 via the interface 40b.

The TLA 40, upon receiving the call set-up request (HS-SET-UP), recognizes it as arrival of a call request to the voice telephone 8, and returns a call out information (HS-ALERT) to the PC 1 while transmitting a ringer ON signal to the voice telephone 8 via an descending control channel of the voice interface 8a. That is, the TLA 40 advises that the voice telephone 8 is being called out. The information is returned via the interface 40b, the LAN hub 20, and the interfaces 20a, 10a, and 1a.

The voice telephone 8, upon receiving the ringer ON signal, notifies the user of arrival of the call by sounding BEEP. When the user of the voice telephone 8 unhooks a receiver, the voice telephone 8 notifies the TLA 40 via a going-up control channel of the voice interface 8a that the receiver is off the hook.

The TLA 40, upon detecting the voice telephone 8 being off the hook, transmits a response (HS-CONN) information to the PC 1, and adds the MAC address of the LAN-SW interface 30a of the TLA 30 and the number of the voice telephone 5 to voice data corresponding to the number of the voice telephone 8, which are assembled into the format shown in FIG. 3, and transmitted to the LAN switching unit 50.

On the other hand, the PC 1, upon receiving the response information, transmits information on the number of the voice telephone 5, the MAC address of the TLA 40, and the number of the voice telephone 8 to the LAN-HUB interface 30b of the TLA 30 for routing voice data in the direction from the voice telephone 5 to the voice telephone 8.

The TLA 30, upon receiving the information, adds the MAC address of the LAN-SW interface 40a of the TLA 40 and the number of the voice telephone 8 to voice data corresponding to the number of the voice telephone 5, which are assembled into the format shown in FIG. 3, and transmitted to the LAN switching unit 50.

The TLA according to the second embodiment of the invention as described above, whereby even when the power supply source for a PC on the receiving end of a call request is turned OFF, a response is detected while arrival of the call request is notified to the user of a voice telephone on the call-in side by use of the control channel signals of the voice interface 8a of the voice telephone, has the same advantage as that for the TLA according to the first embodiment. Further, the TLA enables voice communication all the time as, for example, the voice telephone 8 can be called up even when the power source for the PC associated therewith is off.

Third Embodiment

Figure 6:
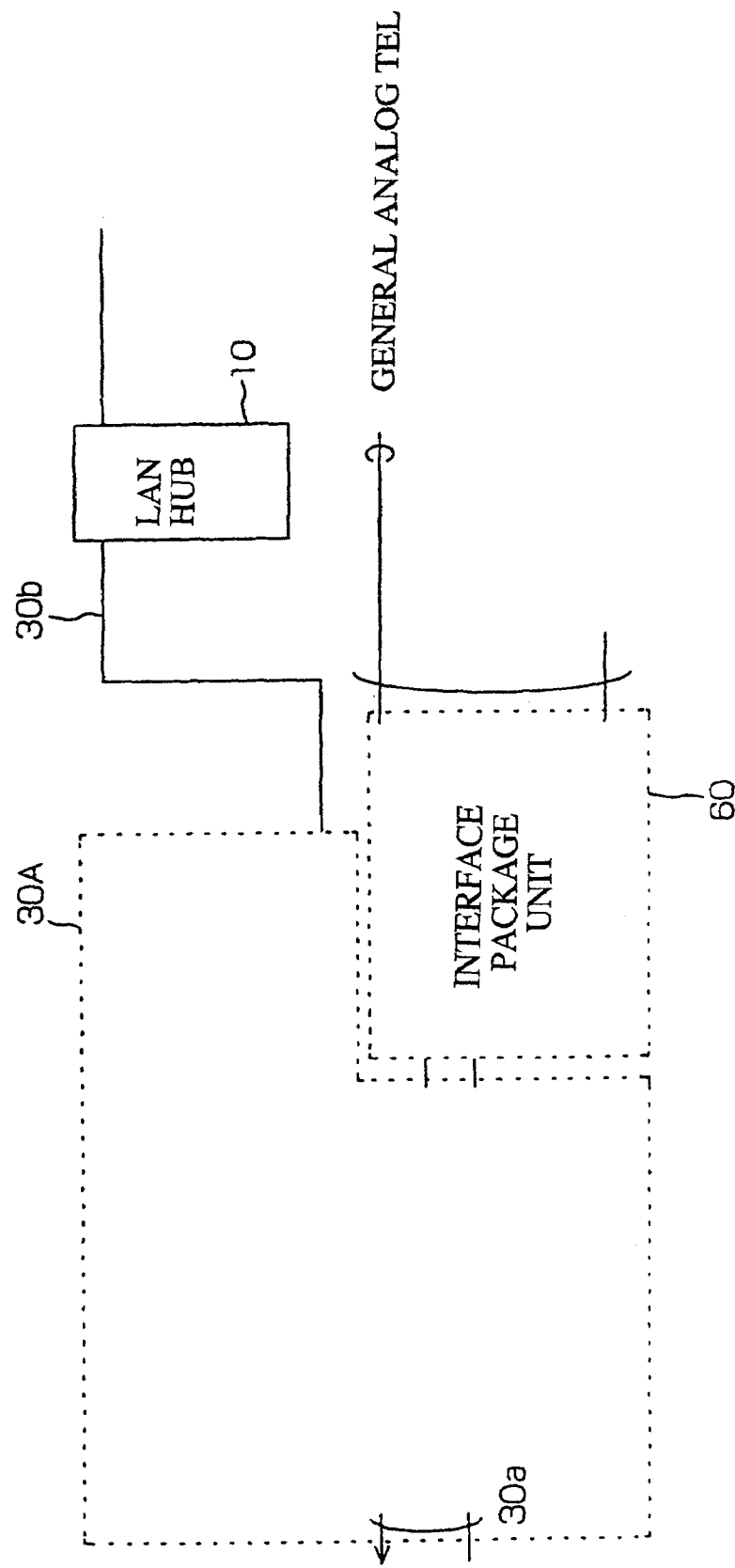
FIG. 6 is a block diagram showing the construction of a TLA according to a third embodiment of the invention.

FIG. 6 is a block diagram showing the construction of a TLA according to a third embodiment of the invention. In the cases of the first and second embodiments of the invention, voice telephones of simplified construction without need for a keypad, and the like can be accommodated, however, telephones of subscribers of common analog telephone networks can not be accommodated. With the TLA according to the third embodiment, common analog telephones can be accommodated in a LAN.

The TLA comprises a TLA controller 30A, the same as that shown in FIG. 2, and an interface package unit 60, different from that shown in FIG. 2.

An external interface of the interface package unit 60 is an interface of subscribers' lines of the common analog telephone networks, and for connection with conventional matching terminals for common analog telephones, G 3 FAX, and the like.

The interface package unit 60 has a so called BORSCHT function required of the analog telephone network subscriber's circuits in an exchange, performing monitoring of power supply, ringer, dial pulse (PB/DP), and the like. The interface package unit 60 performs transmission and reception of information on call control such as the result of receipt of selection signals with a CPU 36 of the TLA controller 30A. The CPU 36 converts information on call control, received from and transmitted to the interface package unit 60, into a call control procedure (equivalent to the case of the first embodiment) over a LAN such as TCP/IP, or the like.

In the result, the interface package unit 60 and the CPU 36 make up a function of converting signals related to call control of the analog telephone network subscriber's circuits, for example, off-hook signal, dial signal, ringer signal, on-hook signal, into a call control protocol over the LAN. That is, the CPU 36 acquires a function equivalent to the functions of the PCs 1 to 4 as described in the first and second embodiments.

Thus the TLA according to the third embodiment is capable of accommodating common analog telephone network subscribers for use of voice telephones over a LAN, accommodating general-purpose terminals, analog telephones, G 3 FAX, and the like.

Fourth Embodiment

A TLA according to a fourth embodiment of the invention is constructed by providing the TLA 30 or 40 as shown in FIGS. 2 or 6 with additional functions of converting voice data received from a plurality of voice telephones accommodated therein into UDP/IP (or TCP/IP) packets, and of transmitting and receiving the packets via the LAN-HUB interfaces 30b and 40b.

With such functions provided, for example, the TLA controller 30A of the TLA 30 is able to convert voice data received from the interface package unit 30B or 60 into packets according to a communication protocol UDP-IP (or TCP-IP). Information on call control is received and transmitted by the communication protocol TCP-IP. The UDP-IP (or TCP-IP) packets obtained by such processing are delivered to the LAN-HUB interface 30b. When, for example, a router is connected to the LAN-HUB interface 30b, the packets are transmitted to an external network via the router.

As described in the foregoing, by use of the TLA according to the fourth embodiment of the invention, communication from the voice telephones 5 to 8 over the LAN becomes feasible via an IP network (for example, Internet) by connecting equipment for performing routing on the basis of IP addresses of routers, and the like to the LAN-HUB interface.

It should be pointed out that the invention is not limited to the embodiments described above, but various modifications may be successfully carried out. By way of example, some modifications are cited hereinafter.

(1) In the voice switching system shown in FIG. 1, the NS unit 51 is connected to the NS switching unit 50; however, it may be connected instead to the LAN hubs 10, 20 as an option.

(2) The NS unit 51 shown in FIG. 1 may be incorporated in the TLAs 30, and 40.

(3) Respective TLAs 30, 40, and respective LAN hubs 10, 20 are constructed separately, however, the TLA 30 and the LAN hub 10, and the TLA 40 and the LAN hub 20 may be integrated, respectively, and incorporated into one unit, respectively.

Figure 7:
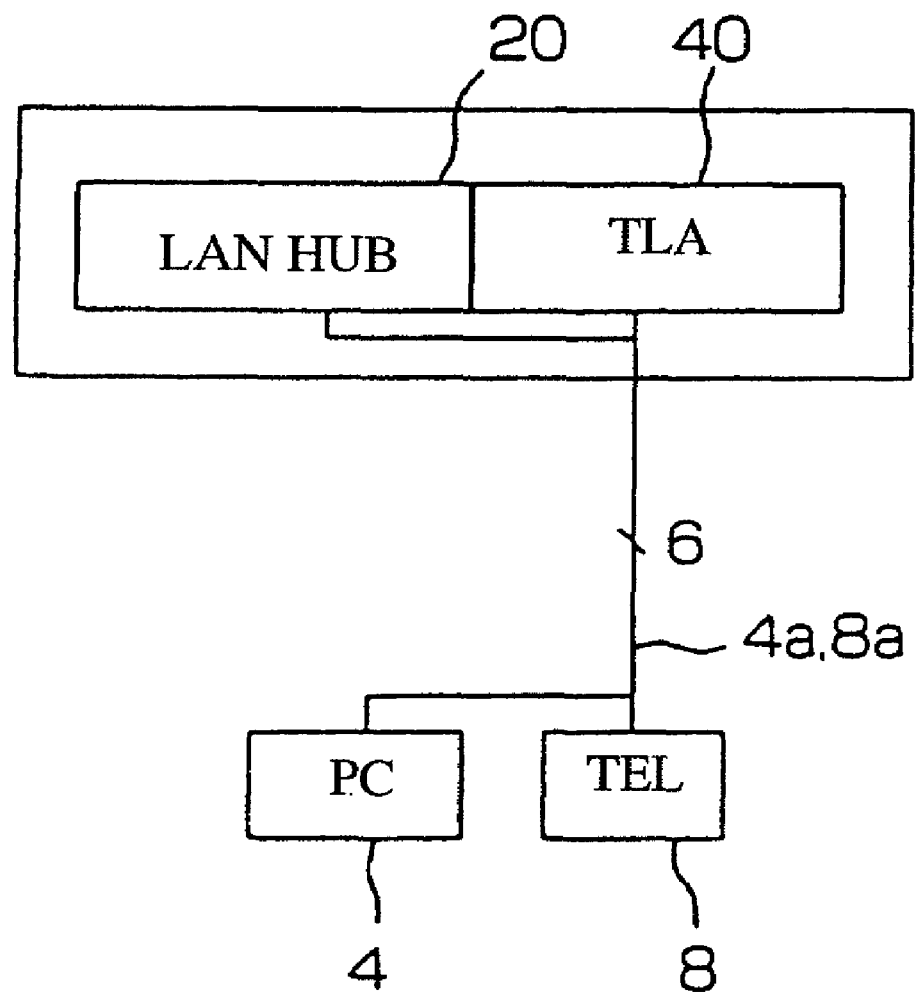
FIG. 7 is a view showing a modification of the TLA shown in FIG. 1.

FIG. 7 is a view showing a modification of the first embodiment shown in FIG. 1, wherein the TLA 40 and the LAN hub 20 are integrated into one unit. With such construction, wiring between the integrated unit and a pair of the PC 4 and the voice telephone (TEL) 8 can be simplified. The pair of the PC and the voice telephone can be connected to the integrated unit via a connector (for example, RJ-45) and a single 8-core modular cord provided in the integrated unit for simplification. 6 cores out of the 8-cores are used for communication. The integrated unit when not connected to the voice telephone functions merely as the LAN hub.

(4) In the aforesaid embodiments, a plurality of TLAs 30, 40 are incorporated in the LAN, however, the same effect may be achieved with a LAN provided with only one TLA. In this case, the LAN-SW interface of the single TLA is used for repeated connection (the LAN switching unit 50 is not required).

(5) FIG. 8 is a block diagram showing TLA having added functions. More effective use of a TLA can be made by providing the TLA with a function of voice compression and a function of transmitting and receiving facsimiles in addition to the functions of the system according to the fourth embodiment of the invention. In FIG. 8, a fax modem unit 70 and a voice compression unit 80 are provided at an input/output end of the TLA 30, on the LAN-HUB interface side. The fax modem unit 70 is constituted so as to be able to make conversions between analog and digital data, and is capable of making transmission and reception with an external network of G 3 FAX via a router. The voice compression unit 80 has a function of compressing voice data at variable compression rates of, for example, max. 8 kb/s. With the voice compression unit 80 provided, transmission and reception of compressed voice data with external networks can be performed.

Industrial Utilization

As described in detail hereinbefore, the TLA according to the first embodiment of the invention enables voice communication over a LAN without need for a PBX, or the like.

With the TLA according to the second embodiment of the invention, the construction of the voice telephone can be simplified. Furthermore, there will be no contention with data sent out by other PCs, and work stations, facilitating calculation of the number of voice telephones incorporated in respective systems.

With the TLA according to the third embodiment of the invention, terminals of common analog telephone network subscribers can be accommodated. Accordingly, G 3 FAX, and the like connected to the interfaces of the common analog telephone network subscribers' circuits can also be accommodated.

With the TLA according to the fourth and fifth embodiments of the invention, voice communication with the outside of the LAN becomes feasible.

With the method of communication according to the sixth aspect of the invention, the construction of a voice telephone can be simplified.

With the method of communication according to the seventh aspect of the invention, voice communication can be performed even when the power supply source for a PC or work station performing call control on the call-in side is OFF.

With the method of communication according to the eighth aspect of the invention, the requirement for high capacity communication is met with greater ease in comparison with a PBX having limitations on the maximum capacity for accommodatable lines.

With the method of communication according to the ninth aspect of the invention, protocol processing is performed easily, and delay time due to packetization is reduced in comparison with the case of assignment made with UDP-IP frame. Further, routing outside the system can be handled, without use of routers, at the MAC frame level by the LAN switching unit, and delay time due to routing is less, resulting in little deterioration in voice quality, a cause for particular concern in voice communication. In addition, the system can absorb fluctuation in arrival time of packetized voices when the LAN switching unit is operating at a high load, ensuring normal conversation over a LAN.

The invention claimed is:

1. A concentrator for a voice telecommunication apparatus, the concentrator being employed in a local area network that includes a LAN hub and a LAN switching unit, said concentrator comprising:
    a controller;
    an interface package unit having BORSCHT (Battery feed, Overvoltage protection, Ringing, Supervision, Coding, Hybrid, and Testing) functions, the interface package unit being connected between the controller and the voice telecommunication apparatus; and
    wherein the controller comprises
        a central processing unit,
        a local area network interface for performing transmission and reception of data, the local area network interface being connected between the central processing unit and the LAN hub, and
        means for communicating signals between the LAN switching unit and the interface package unit,
    wherein digital voice data, analog voice data or call control data received from the voice telecommunication apparatus is converted into transmission control protocol—internet protocol packets or user datagram protocol—internet protocol packets, and
    wherein the transmission control protocol—internet protocol packets are transmitted and received via the local area network interface.

2. The concentrator of claim 1, wherein the voice telecommunication apparatus is an analog telephone.

3. A telecommunication apparatus for use with a voice telecommunication apparatus in a local area network including a plurality of local area network equipment units, the telecommunication apparatus comprising:
- a controller that includes
  - a local area network interface connected to one of the local area network equipment units, and
  - a central processing unit, the central processing unit being connected to the local area network interface; and
- an interface package unit having BORSCHT (Battery feed, Overvoltage protection, Ringing, Supervision, Coding, Hybrid, and Testing) functions, the interface package unit being connected between the controller and the voice telecommunication apparatus,
- wherein the controller additionally includes means for communicating signals between the interface package unit and another of the local area network equipment units, and
- wherein the controller converts data received from the interface package unit into transmission control protocol/internet protocol packets or user datagram protocol packets for transmission to the local area network interface.

4. The concentrator of claim 3, wherein the voice telecommunication apparatus is an analog telephone.

5. A method of communication over a local area network having LAN switching unit, comprising:
- receiving and transmitting digital voice data, analog voice data or call control data between a voice telecommunication apparatus and an interface package unit having BORSCHT (Battery feed, Overvoltage protection, Ringing, Supervision, Coding, Hybrid, and Testing) functions;
- receiving and transmitting the digital voice data, analog voice data or call control data between the interface package unit and a controller having a central processing unit;
- converting the digital voice data, analog voice data or call control data into internet protocol packets or media access control frames with the central processing unit;
- transmitting the internet protocol packets or media access control frames from the controller to a local area network interface; and
- communicating signals between the interface package unit and the LAN switching unit.

6. The concentrator of claim 5, wherein the voice telecommunication apparatus is an analog telephone.

* * * * *